2,769,321
Patented Nov. 6, 1956

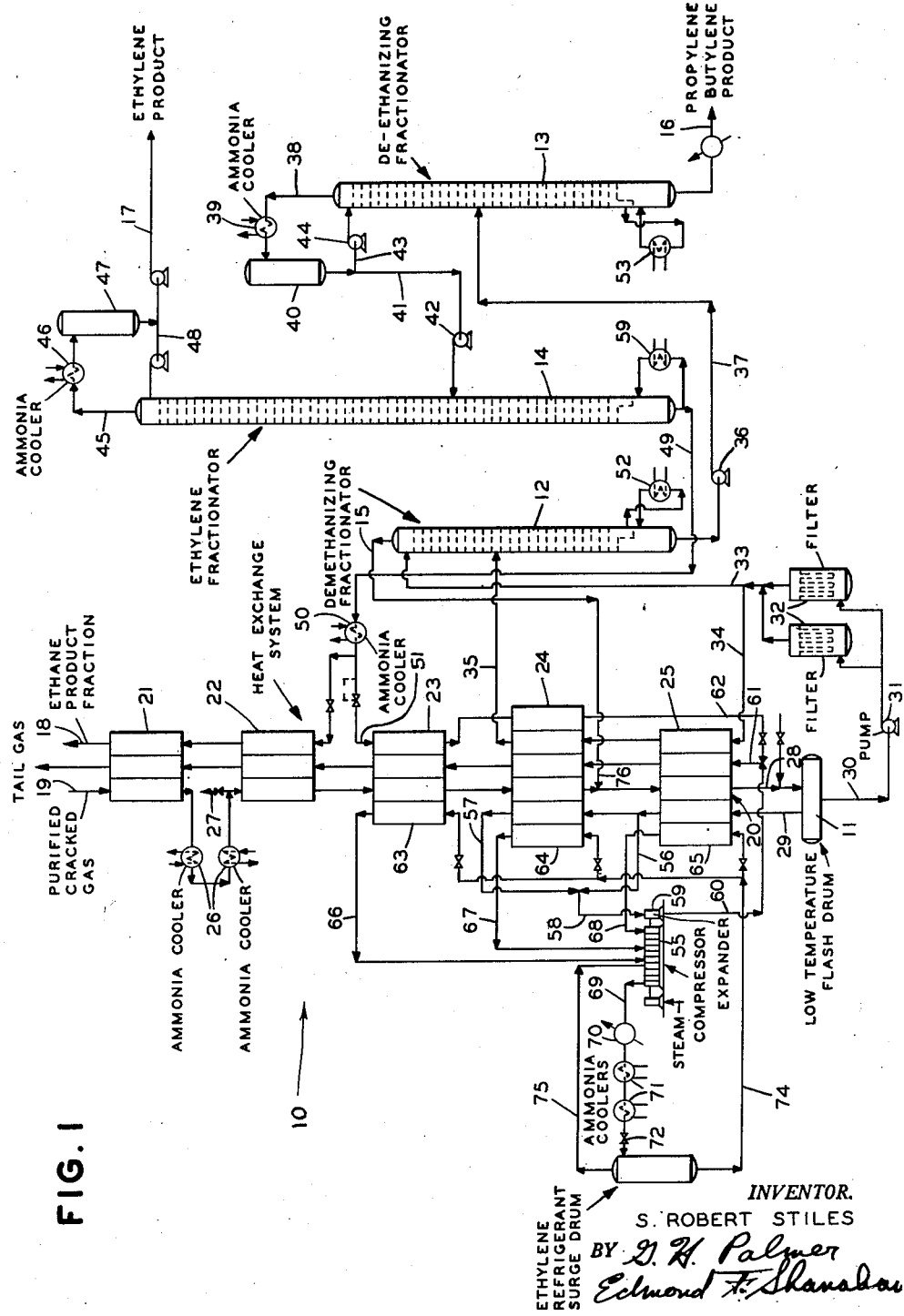
FIG. I
INVENTOR.
S. ROBERT STILES
BY D. H. Palmer
Edmond F. Shanahan
ATTORNEY

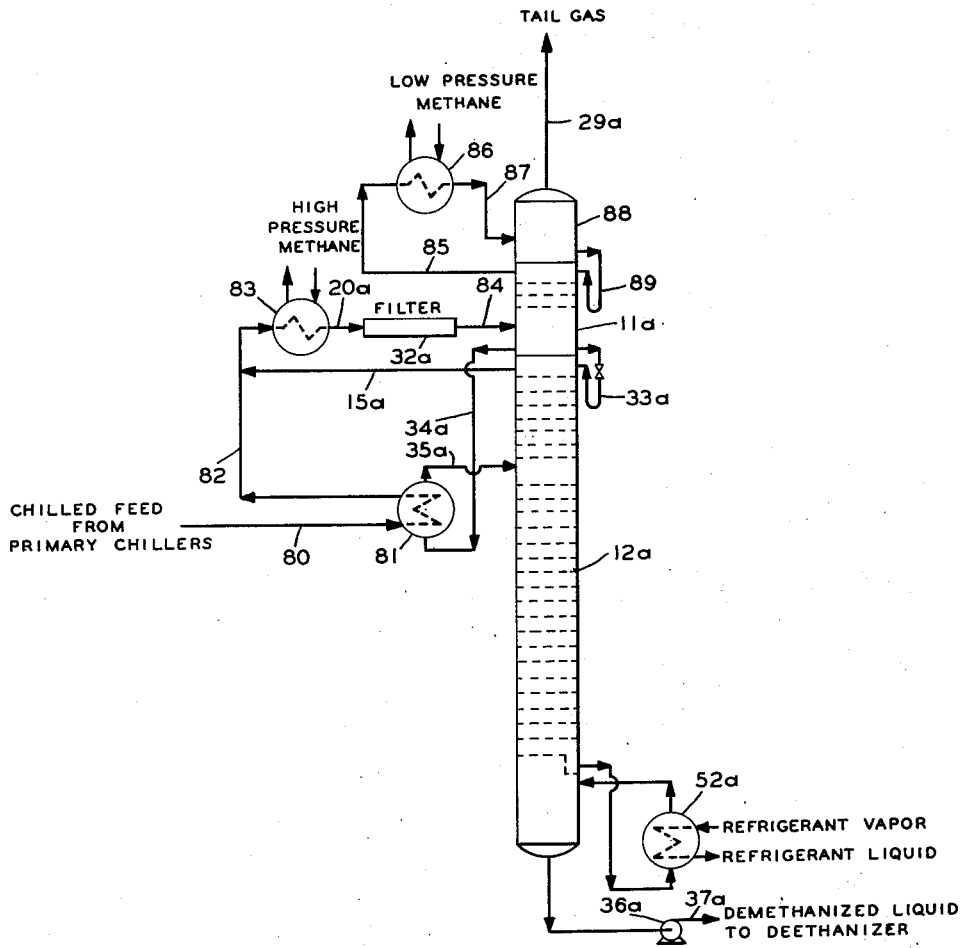

2,769,321

SEPARATION OF ETHYLENE FROM A GASEOUS MIXTURE

Samuel Robert Stiles, Cresskill, N. J., assignor to The M. W. Kellogg Company, Jersey City, N. J., a corporation of Delaware Application August 7, 1952, Serial No. 303,114

10 Claims. (Cl. 62—175.5)

This invention relates generally to the recovery of an ethylene product from a mixture of low boiling gases, for example petroleum refinery gases, by fractional distillation at low temperatures and under superimposed pressures; more particularly, this invention is a method for recirculating a methane fraction from a fractionating system to the inflowing compressed gaseous mixture to establish equilibrium conditions, whereby methane can be flashed from said inflowing compressed gaseous mixture at a point at or near the lowest temperature in the system, with a minimum loss of ethylene product.

Most of the ethylene produced commercially is obtained from a mixture of ethylene, heavier hydrocarbons, and other gases produced as a by-product of petroleum refining by catalytic or thermal cracking, or by pyrolysis of ethane or propane from natural gas. The effluent from cracking is separated into gas oil, gasoline, other liquid products, and so-called "noncondensables." The latter is a mixture of hydrocarbons not easily liquefied, usually propane and lighter gases, including ethylene, methane, hydrogen, and in some cases, nitrogen and carbon monoxide. Also, there may be undesirable impurities such as sulfur compounds or water vapor. However, it is not impossible that ethylene may be obtained from similar gaseous mixtures produced in other ways. For example, in the synthesis of hydrocarbons from coal, oxygen and water by the Fischer-Tropsch process or the like, a mixture of low boiling hydrocarbons can be produced as one of the reaction products; the present process could be employed to recover valuable ethylene product from such a mixture. Still another possible source of a gaseous mixture containing ethylene might be pyrolysis or severe cracking of such gases as ethane, propylene, propane or butanes, obtained from natural gas, refinery gas, etc.

A mixture suitable for the present process ought to have at least 2 percent ethylene in order to be preferred under presently known economic conditions; however, the invention is operable on all ethylene-containing mixtures containing methane and/or lighter gases, including even less than 1 percent ethylene or over 90 percent ethylene. It is not necessary to employ the present type of process, with its low temperature fractionation, unless there are present certain gases having a lower boiling point than ethylene. Methane is the gas which usually presents the separation problem here dealt with but hydrogen or the like might be involved even in the absence of any methane.

Secondly, the present process depends for its operability on the presence of other gases having boiling points slightly above the boiling point of ethylene. The inventor has found that it is easier to separate a slightly lower boiling gas, methane for example, from a mixture containing ethylene and somewhat higher boiling gases, higher boiling hydrocarbons, for example, than it is to separate the methane from a mixture of methane and ethylene only. In the latter case it is necessary to make the separation at a substantially lower temperature, probably below $-200°$ F., depending on the pressure. However, the methane can be boiled from a mixture of ethylene and higher boiling hydrocarbons at a higher temperature, with only very little loss of ethylene. For example, if there are sufficient higher boiling hydrocarbons present, most of the ethylene can be condensed (together with the higher boiling hydrocarbons) at relatively higher temperatures, for example about $-175°$ F., at pressures 200 p. s. i. a. It is apparent, therefore, that it is actually undesirable to carry fractional distillation to the point that most of the higher boiling hydrocarbons are eliminated at the upper end of the frictional distillation tower at which methane is separated. It is better to withdraw from the upper end of the demethanizing tower a higher boiling mixture containing substantial amounts of higher boiling hydrocarbons and to flash from this mixture a vapor comprised mostly of methane and only a very small amount of ethylene (and traces of the heavier material). Great savings are effected in this manner. The demethanizing fractionating tower does not require as many trays as it would if it were necessary to withdraw only pure methane from the top tray. Much more importantly, however, is the saving in refrigeration costs by carrying out the process at a minimum temperature of only $-175°$ F. or at least a minimum temperature falling within the range of $-125°$ F. and $-225°$ F. In a low temperature process, it is increasingly expensive to cool the process material to lower and lower temperatures and great savings are effected if the lowest temperature in the system can be raised a few degrees.

The following table shows typical charge gas mixtures:

TABLE I

*Typical gases from refinery and pyrolysis operations*

[Composition—Gas volume percent.]

| Component | A<br>Catalytic Cracker Absorber Gas | B<br>Thermal Cracker Absorber Gas | C<br>Unstabilized Propane Gas | D<br>Ethane Pyrolysis Gas | E<br>Propane Pyrolysis Gas | F<br>Naphtha Pyrolysis Gas |
|---|---|---|---|---|---|---|
| Hydrogen Sulfide | 3.6 | 0.4 | 0.4 | | | |
| Carbon Monoxide | 4.0 | | | | | |
| Carbon Dioxide | 4.0 | | 7.2 | | | |
| Nitrogen | 14.1 | 0.2 | 2.0 | | | |
| Hydrogen | 22.2 | 5.8 | 1.0 | 33.6 | 13.0 | 12.5 |
| Methane | 24.0 | 33.3 | 5.2 | 3.3 | 31.6 | 29.6 |
| Ethylene | 5.8 | 3.6 | 5.2 | 31.8 | 23.8 | 26.5 |
| Ethane | 11.4 | 22.1 | 8.6 | 29.6 | 7.3 | 7.2 |
| Propylene | 6.9 | 11.1 | 28.8 | 1.0 | 8.2 | 15.9 |
| Propane | 2.5 | 20.8 | 30.0 | | 11.3 | 0.5 |
| Butylenes | 0.9 | 0.7 | 3.9 | 0.5 | 0.9 | 7.7 |
| Butanes | 0.6 | 1.5 | 7.4 | | | 0.1 |
| Pentanes and Heavier | | 0.5 | 0.3 | 0.2 | 3.9 | |
| | 100.0 | 100.0 | 100.0 | 100.0 | 100.0 | 100.0 |

The savings in refrigeration effected may be illustrated as follows:

In order to obtain 95 percent ethylene recovery by conventional low temperature fractionations, the following low temperatures must be reached at the reflux drum; for the pressures specified:

For a pressure of:

| | °F. |
|---|---|
| 100 p. s. i. a. | −231 |
| 150 p. s. i. a. | −220 |
| 200 p. s. i. a. | −211 |
| 300 p. s. i. a. | −196 |

On the other hand, if the present invention is employed, the minimum temperature of the system would be between 20° F. and 30° F. higher.

The vapor from the demethanizing tower contains, it is true, traces of ethylene, usually between 2 and 15 percent. However, this ethylene is recovered because the demethanizing tower vapor is reintroduced into the inflowing compressed mixture stream. This stream is introduced into a low temperature flash drum preceding the demethanizing tower.

Since the present process involves refrigeration and fractionation at low temperatures, certain purification steps are necessary. Water content must be reduced, for example, by chemical or adsorption type drying, and then by freezing and filtering out ice particles.

Hydrogen sulfide is removed by chemical means because it might damage the equipment and because it is not wanted in the product. Acetylene is converted by catalytic hydrogenation to ethylene prior to the cooling process.

The purified gas, which is generally purified cracked gas, is brought in under a pressure of about 150 p. s. i. g., for example, although pressures from 50 to 500 p. s. i. g. might be used; but the preferred economic range is 100–250 p. s. i. g. The compressed gas is introduced into a series of counter-current heat exchangers in which it is refrigerated to a temperature of about −150° F., preferably within a range of −225° F. to −125° F. The cooling streams are partly outflowing cold products and partly closed ethylene ammonia, or propane refrigerating cycles within the system. The inflowing gaseous mixture emerges from the cold end of this series of refrigeration steps as a liquid-vapor mixture.

The liquid-vapor mixture is introduced into a low temperature flash drum which is about the coldest point in the system. In this drum the gases which have not been are flashed off and are employed in a manner detailed hereinafter, as a cooling medium leaving the system in counter-current heat exchange with inflowing compressed gaseous mixture.

The liquid from the low temperature flash drum is subjected to a series of fractionations in fractionation towers at low temperature in order to separate recycle and various products. The point of the present invention is in the manner of recycling a gaseous fraction separated in the fractionation steps to the series of refrigeration steps so that gases having a lower boiling point than ethylene, most importantly methane, are separated from the ethylene-rich liquid.

The accompanying drawings illustrate two specific embodiments for carrying out the process of the present invention:

In Figure 1 is shown a flow diagram of an ethylene recovery system employing an ethylene refrigerant at its lowest temperature point. It is suitable for mean temperatures of about −150° F. and recovery reaching from up to about 90 percent of the ethylene;

Figure 2 illustrates a system employing methane refrigeration to obtain its mean temperatures; although its lowest temperatures are about the same as those in a conventional system, it has the advantage of recovering nearly 90 percent of the ethylene with only a small amount of refrigerant duty at the lowest temperatures.

In Figure 1, numeral 10 indicates generally a series of 5 counter-current refrigeration steps, from the cold end of which a cold liquid-vapor mixture is discharged into a low temperature flash drum 11. The liquid from low temperature flash drum 11 is fractionated in a series of three fractionation towers 12, 13 and 14 in order to obtain a low-boiling gas recycle 15, propylene and butylene product 16, and ethylene product 17.

In greater detail, an inflowing gaseous mixture containing ethylene, for example purified olefins bearing gas from a petroleum refinery, such as any one or combination of the typical ethylene-containing hydrocarbon streams listed in table I, enters the ethylene recovery system at the warm end of heat exchange system 10, near product gas outlet 18, by way of inflowing gas inlet 19 and emerges at cold end 20 after passing through a series of five heat exchangers 21, 22, 23, 24 and 25. It will be understood, of course, that although a counter-current indirect heat exchange system utilizing refrigeration available from the products at economical levels and several levels of auxiliary refrigeration supplied by the cascade principle is an economical method of cooling, other means of cooling the incoming mixture to the desired temperature and pressure can be used.

A variety of arrangements for the series of heat exchangers are known to those skilled in the art and the illustrated arrangement is merely an example. In this example, combination exchangers using several adjacent passes to exchange heat between two or more fluids in a manner to approach true counter-current flow are used.

Auxiliary refrigeration is supplied by vaporizing and condensing three refrigerants at various temperature and pressure levels with the lower level refrigerant being condensed by the next higher level refrigerant with the highest level refrigerant condensed by water. This cascade system is also well known to those skilled in the art and various combinations of one or more refrigerants using compressors or other means to effect temperature and pressure levels for heat transfer can be used. In these examples, ammonia, ethylene and methane are used in the cascade with methane supplying the lowest level refrigeration.

The five heat exchangers may be catalogued as follows:

*Heat exchanger 21.*—For cooling the inflowing gaseous mixture from entering temperature (close to atmospheric) to about 20° F. by heat exchange with outflowing products, tail gas, and ethane.

*Heat exchanger 22.*—For cooling inflowing mixture by vaporizing ethane and by other vapor products subsequent to ammonia refrigeration. In this heat exchanger, the inflowing gaseous mixture is cooled by the same counter-flowing streams as in heat exchanger 21, namely the outflowing tail gas and ethane product, but intermediate ammonia refrigeration in ammonia coolers 26 makes possible more efficient utilization of heat (i. e. less enthalpy loss) because of a smaller temperature difference between the counter-flowing streams.

*Heat exchanger 23.*—The first ethylene refrigerated heat exchanger cools inflowing gaseous feed from −60° to −80° F. and also cools excess liquid ethane that is to be rejected to the tail gas for use as a low temperature level refrigerant. This exchanger also recovers refrigeration from tail gas.

*Heat exchanger 24.*—For cooling inflowing mixture and excess liquid ethane, not desired as separate product, to about minus 90° F. This cooling is accomplished by heat exchange with tail gas product and the highest temperature level of refrigerant. Ethylene is used in the illustration although other refrigerants of similar vapor pressure characteristics could be used. Ethylene liquid product is vaporized in a portion of the exchanger passage to supply a portion of the refrigeration needed.

*Heat exchanger 25*—is the methane recycle heat exchanger; methane withdrawn from demethanizer fractionator 12 is recycled to the heat exchange system 10 by way of recycle line 15 at this point. The inflowing gaseous mixture is cooled in this heat exchanger from —100° F. to its coldest temperature or about —150° F.

A gaseous mixture flows from the cold end 20 of heat exchanger 25 through line 28 and enters the low temperature flash drum in a mixture of vapor and liquid. The gases separate overhead in drum 11 and leave it by way of line 29, entering cold end 20 of heat exchanger 25 and flowing back through heat exchangers 24 and 25 to be employed in an auxiliary refrigerant cycle as described hereinafter. Preferably no methane would remain in the liquid within drum 11, but this condition cannot be established with ordinary mixtures charge to ethylene recovery processes and it is necessary to demethanize in the manner which is applicant's invention.

The ethylene-containing liquid from flash drum 11 flows via line 30 to pump 31 where the pressure is increased sufficiently to overcome pressure drop, friction, etc. to be charged to demethanizer tower 12. This liquid flows then by way of line 33 to the upper end of demethanized fractionator 12 to function as reflux on this tower. Preferably, but not necessarily, between 100 percent and 80 percent of the liquid material is diverted through line 34 to be counter-flowed hrough heat exchangers 24 and 25 and warmed thereby to a temperature of about —90° F. and introduced into demethanizer fractionator 12 at an intermediate point by way of line 35 to reduce the reboiler load and improve the thermal efficiency of the process.

In demethanizer fractionator 12 the liquid collected in flash drum 11 is separated into a predominantly methane overhead vapor and a liquid bottoms fraction with the relative quantities depending on the liquid of ethylene recovery and the pressure of the system. The bottoms from demethanizer fractionator 112 are pumped by pump 36 to deethanizer fractionator 13 by way of line 37. In deethanizer fractionator 13 the bottoms consist of propylene-butylene product. The overhead gases are withdrawn from deethanizer fractionator 13 by way of line 38, cooled to liquefaction in ammonia cooler 39, and collected as a liquid in condenser 40. The liquid collected in condenser 40 is mostly converted to the condensation step in ethylene fractionator 14 by way of line 41 and pump 42 but part may be recycled to deethanizer fractionator 13 as reflux via reflux line 43 and reflux pump 44.

In ethylene fractionator 14 the recondensed overhead from deethanizer fractionator 13 is fractionally distilled into an overhead ethylene product and a bottoms fraction. The overhead ethylene fraction is withdrawn by way of line 45, cooled to condensation in ammonia cooler 46. and collected in drum 47. Part is withdrawn by way of line 17 as ethylene product and part recycled as reflux in ethylene fractionator 14 by way of line 48. The bottoms fraction is withdrawn from ethylene fractionator 14 by way of line 49, cooled by means of ammonia cooler 50, and part reintroduced into the heat exchange system at 51, located at the warm end of heat exchanger 23, and part diverted out of the nystem as ethane product.

At the lower ends of fractionators 12, 13 and 14 reboilers 52, 53 and 59, employing a warming liquid, serve to maintain fractionator bottoms temperature slightly higher than the temperature of the charge so as to accomplish the fractional distillations.

The inflowing gaseous mixture is cooled to the fractionation temperatures mostly by heat exchange with outflowing tail gas and ethane product. However, refrigeration for starting up, for making up leakage losses, and for balancing enthalpy losses, is supplied by means of a steam operated multiple stage compressor 55 which compresses ethylene in one series of stages and low boiling gases, predominantly methane, in another. Low boiling gases from low temperature flash drum 11 enter the cold end 20 of the coldest heat exchanger 25 and flow outwardly, part through heat exchanger 25 and part through both heat exchanger 25 and heat exchanger 24; these portions leave heat exchanger system 10 by way of lines 56 and 57 respectively, are combined in line 58. This slightly warmed gas is then expanded in expander 59, the power generated being employed as part of the motivation of compressor 55. The low pressure cold stream then leaves expander 59 by way of line 60, is combined at 61 with another low pressure stream 62, source of which will be described hereinafter, and flows out of the entire system as tail gas. Each of heat exchangers 23, 24 and 25 is provided with a stream of relatively cold ethylene refrigerant from compressor 55, said refrigerant passing through heat exchangers 23, 24 and 25 by way of cooling paths 63, 64 and 65, respectively, and being returned at appropriate stages in compressor 55 by way of lines 66, 67 and 68. The compressed ethylene gas leaves compressor 55 by way of line 69, is cooled by cooling water in heat exchanger 70 and then by means of ammonia coolers 71 to condensation. The ethylene, now mostly liquid, flows through valve 72 into ethylene refrigerant surge drum 73. Ethylene refrigerant from ethylene surge drum 73 is flowed through cooling paths 63 by way of line 74 and interway piping. Vapors escaping through ethylene surge drum 73 leave the drum overhead by way of line 75 and enter compressor 55 at a relatively high stage compression for recompressing and condensing.

The most important point of novelty of this invention is the recycle of low boiling gas, methane from demethanizer fractionator 12 to inflowing compressed gaseous stream at the warm end 76 of low temperature heat exchanger 25 by way of line 15. The continuous recycling of methane gradually builds up the methane content of the inflowing gaseous stream as it passes through heat exchanger 25 to the point at which substantially all the gas which flashes off in low temperature flash drum 11 is methane or a gas having a lower boiling point. This not only insures rejection of the methane to the tail gas but makes possible a nicer discrimination between methane and the ethylene containing fraction in demethanizer fractionator because of the presence of heavier material at the lowest temperature.

In Figure 2 is shown a preferred modification of the invention which eliminates the necessity for a low temperature pump. This modification and the final stages of chilling the inflowing charge gas are accomplished by indirect heat exchange with methane, the object being to cool the liquid-vapor mixture to temperatures some what lower than in the ethylene cooled system of Figure 1. Whereas the lowest temperatures in the system of Figure 1 were in the range of about 145° F., in the present system, the feed enters from primary chillers which may be cascade system utilizing ammonia or propane, flowed by one or more stages of ethylene. The temperature in the range of about —100° F. to —140° F. and is further chilled by methane to a temperature in the range of —160° F. to —210° F.; the pressures, of course, would correspond to the temperature selected. A second important feature of the embodiment of Figure 2 is that no pump is required in the low temperature part of the system. Although the sketch of Figure 2 is diagrammatic as to apparatus details, it carefully and accurately represents the relative elevation of the different components in such a manner that flow through the system can be carried out under relatively low head at which the chilled feed arrives from the primary chillers.

The methane cooled system of Figure 2 might be integrated into a system very similar to Figure 1, so far as the primary chilling stages and the deethylizing fractionator and the ethylene fractionator are concerned. Parts of Figure 2 which correspond to those in Figure 1 are indicated by the same numeral followed by the letter "a." Feed from the primary chillers may be introduced into the methane chilling stage through line 80, and is cooled by indirect heat exchange with condensed feed liquid in heat exchanger 81 and passes by way of line 82 to heat exchanger 83, preferably a tube and shell type, by heat exchange with vaporizing liquid methane under relatively high pressures (between about 100 and 200 p. s. i. g.) and a low temperature corresponding to said pressure.

Chilled feed leaves heat exchanger 83 by way of line 20a and in a condition which may be described as a stream of very cold vapor with a substantial percentage of entrained liquid; whether or not liquid or vapor will predominate will depend upon on composition of the feed mixture.

Hydrates are removed by charge through filter 32a. The filtered cold stream enters low temperature flash zone 11a. Most of the condensed liquid from the bottom of low temperature flash zone 11a is withdrawn through line 34a passes through heat exchanger 81 already described, and by way of line 85a into demethanizing fractionator 12a, being partially vaporized in the process. The remainder of condensed liquid reaches the upper end of fractionator 12a by way of line 33a which is in the form of a seal loop. Vapor from zone 11a leaves its upper end by way of line 85, is chilled in heat exchanger 86 and flows by way of 87 to a secondary flash zone 88 in which a final condensation of ethylene-containing liquid takes place. The low pressure methane which serves as a refrigerant in heat exchanger 86 will have a temperature of between −190° F. to −250° F., and correspondingly lower pressures. Both the high pressure and the low pressure methane refrigerant may be obtained from different stages of the same reciprocating compressor, although the quantity of low pressure methane will generally be only between 20 and 50 percent of the high pressure methane required.

Uncondensed tail gas from secondary flash zone 88 is withdrawn through line 29a and passed through heat exchangers in an indirect heat exchanger with incoming feed and probably other refrigerant fluids. The liquid condensed in secondary zone 88 passes downwardly through seal loop 89 to the upper end of vertically extended zone 11a and serves therein as a reflux liquid.

Reboiling of demethanized liquid at the bottom end of fractionator 12a is accomplished in the usual manner by means of reboiler 52a. Demethanized liquid from the bottom of demethanized fractionator 12a is pumped by means of pump 36a through line 37a to be subsequently processed for the recovery of ethylene products and such other products as may be associated with it.

It will be seen that Figure 1 is best suited for systems in which a recovery of 80 to 90 percent (or in some cases lower recovery) of ethylene is satisfactory, whereas the system of Figure 2, somewhat more expensive because of the methane refractionation system, would be employed where higher recovery of ethylene was desired. The latter system will be preferred where the cost of feed or utilities and other operating expenses are relatively high, whereas the former will be preferred for localities, such as the gulf coast of the United States, where such costs are relatively low.

It will be seen that both embodiments of applicant's process carry out the demethanizing fractionation most efficiently by supplying a minimum of heat to the reboiler 52 (or 52a) at the bottom of tower 12 (or 12a). It is necessary, of course, that sufficient "high temperature heat" be supplied by reboiler 52 to provide adequate upflowing stripping gases through the lower part of tower 12. But supplemental stripping gases required in the part of tower 12 (i. e. above line 35) are most efficiently supplied by the partial vaporization of the stream entering tower 12 through line 35. In a counter-part manner, reflux duty on methane condenser 86 is reduced because heat exchanger 83 serves both as feed cooler and reflux condenser for vapor withdrawn through line 15a.

It will be understood, that filters 32 and 32a are conventional parts of apparatus such as that herein disclosed, and are used for the elimination of hydrate crystals. They are almost always employed, but are not mentioned in the claims as a separate step because they are conventional and to be understood as being present wherever hydrate elimination is ncessary. It is also to be understood that filters 32 might precede pump 31.

I claim:

1. In a process for recovering ethylene from a mixture of low boiling gases, in which said low boiling mixture is cooled to partial liquefaction and is then fractionated to separate said gaseous mixture into several components, a method for recovering ethylene from a low boiling fraction which includes the steps of: separating said partially liquefied gaseous mixture subsequent to said cooling step, and at the coldest point in said process into liquid and vapor; removing said vapor from further contact with any process stream from which ethylene product is derived; introducing said liquid into a first fractionating zone and fractionating said liquid therein into a relatively heavy fraction containing most of the ethylene and a relatively light fraction containing most of the relatively lighter gases and some ethylene; recycling said light fraction to said inflowing gaseous mixture as it flows to said liquid-vapor separation step; and recovering ethylene from said heavy fraction.

2. In a process for recovering ethylene from a mixture of low boiling gases, including methane, in which said low boiling mixture is cooled to partial liquefaction by indirect heat exchange in a series of heat exchange steps, and is then fractionated in a series of vertically extended fractionating zones, each of said zones being maintained at successively higher temperatures to separate said gaseous mixture into several components, a method for recovering ethylene from a low boiling fraction, which includes the steps of: separating said partially liquefied gaseous mixture subsequent to said indirect heat exchange steps and at the coldest point in said process into liquid and vapor; removing said vapor from further contact with any process stream from which ethylene product is derived; introducing said liquid into a first fractionating zone and fractionating said liquid therein into a relatively heavy fraction containing most of the ethylene and a relatively light fraction containing most of the methane and some ethylene; recycling said overhead product to said inflowing compressed gaseous mixture at a point in said series of refrigeration steps at which the temperature is not substantially lower than the temperature of said recycle stream to build up the methane content of said inflowing stream prior to said liquid-vapor separation step to an equilibrium condition in which methane is flashed into gas in said liquid-vapor separation step at a rate not substantially less than the rate at which methane enters the system.

3. In a process for recovering ethylene from a mixture of low boiling gases, containing methane and hydrocarbon heavier than ethylene, in which said low boiling mixture is cooled by indirect heat exchange in a series of heat exchange steps to partially liquefy said gaseous mixture, and is then fractionated in a series of vertically extended fractionating zones, each of said zones being maintained at an increased pressure and higher temperature range to separate said gaseous mixture into several components, a method for recovering ethylene from a low boiling fraction which includes the steps of: separating said partially liquefied gaseous mixture subsequent to said indirect heat exchange steps and at the coldest point in said process into liquid and vapor; removing said vapor from further contact with any process stream from which ethylene product is derived; introducing said liquid into a first fractionating zone and fractionating said liquid therein into a relatively heavy fraction containing most of the ethylene and a relatively light fraction containing most of the methane in said liquid and some ethylene; recycling said overhead fraction to said inflowing compressed gaseous mixture to build up the methane content of said inflowing stream prior to said liquid-vapor separation step to an equilibrium condition in which methane is flashed into vapor in said liquid-vapor separation step at a rate not substantially less than the rate at which methane enters the system.

4. In a process for recovering ethylene from a feed mixture of low-boiling gases, said mixture containing at least ethylene, methane, and gases higher-boiling than ethylene, an improved method for eliminating methane, which includes the steps of: cooling said feed to a temperature near the boiling temperature of ethylene; discharging said cooled feed into a vapor-liquid separation zone, withdrawing vapor from the upper end of said zone, and liquid from the lower end; cooling said withdrawn vapor to partial condensation, and discharging condensate and remaining vapor into a tail-gas separation zone to separate a tail gas, containing most of said methane, from a condensate, said tail gas separation zone being sufficiently elevated to permit the flow of said condensate from said zone to said vapor-liquid separation zone; flowing condensate from said tail-gas separation zone into said vapor-liquid separation zone by gravity; flowing by gravity a first portion of liquid from said vapor-liquid separation zone, warming said liquid to produce a partial vaporization, and introducing said warmed stream into a vertically extended fractionation zone at a point substantially removed from both upper and lower ends thereof, said fractionation zone being sufficiently lower than said vapor-liquid separation zone, to permit gravity flow to the latter; withdrawing vapor from the upper end of said fractionation zone and recombining it with said feed prior to its entry into said vapor-liquid separation zone; flowing by gravity a second portion of said liquid from said vapor-liquid separation zone to the upper end of said fractionation zone to serve therein as reflux; maintaining the lower end of said fractionation zone at a temperature higher than the upper end thereof; withdrawing from the lower end of said fractionation zone a liquid containing most of the ethylene content of said feed, and recovering an ethylene product therefrom.

5. In a process for recovering ethylene from a feed mixture of low-boiling gases, said mixture containing at least ethylene, methane, and hydrocarbons higher-boiling than ethylene, in which said low-boiling mixture is cooled to partial liquefaction and separated by fractionational distillation, an improved method for separating ethylene and methane which includes the steps of: cooling said feed to a temperature at which most of the ethylene is liquefied; further cooling said feed by indirect heat exchange with a stream of vaporizing methane under pressure; discharging said cooled feed into a vertically extended vapor-liquid separation zone, withdrawing vapor from the upper end of said zone, and liquid from the lower end; flowing said withdrawn vapor in indirect heat exchange with methane vaporizing under lower pressure than said first methane stream, to further cool and partially condense said vapor, and discharging said vapor and condensate into a tail gas separation zone to separate a tail gas, containing most of said methane, from a condensate, said tail gas separation zone being sufficiently elevated to permit the flow of condensate from said zone to said vapor-liquid separation zone; flowing condensate from said tail gas separation zone into the upper end of said vapor-liquid separation zone by gravity; flowing by gravity a first portion of liquid from the lower end of said vapor-liquid separation zone in indirect heat exchange with a warmer stream to partially vaporize said liquid; and introducing said warmed portion into a vertically extended fractionation zone at a point substantially removed from both upper and lower ends thereof, said fractionation zone being sufficiently lower than said vapor-liquid separation zone, to permit gravity flow to the latter; withdrawing vapor from the upper end of said fractionation zone and recombining it with said feed prior to said methane cooling step; flowing by gravity a second portion of said liquid from the lower end of said vapor-liquid separation zone to the upper end of said fractionation zone to serve therein as reflux; maintaining the lower end of said fractionation zone at a temperature higher than the upper end thereof; withdrawing from the lower end of said fractionation zone a liquid containing most of the ethylene content of said feed, and recovering an ethylene product therefrom.

6. A method as described in claim 5 in which said warmer stream is said feed stream prior to its passage in heat exchange with said high pressure methane stream.

7. A method as described in claim 5 in which said warmer stream is a stream of refrigerant which can be condensed by said heat exchange, and said refrigerant is subsequently used to cool feed.

8. In a process for recovering ethylene from a feed mixture of low-boiling gases, said mixture containing at least ethylene, methane, and hydrocarbons higher boiling than ethylene, in which said low-boiling mixture is cooled to partial liquefaction and separated by fractional distillation, an improved method for ethylene and methane which includes the steps of: cooling said feed to a temperature at which most of the ethylene is liquefied; discharging said cooled feed into a vapor-liquid separation zone, and separately withdrawing vapor and liquid from said zone; flowing a first portion of said liquid in indirect heat exchange with a warmer stream to vaporize a substantial part thereof, and introducing said warmed first portion into a vertically extended fractionation zone at a point substantially removed from both upper and lower ends thereof; flowing a second portion of said liquid from said vapor-liquid separation zone to the upper end of said fractionation zone to serve therein as reflux; maintaining the lower end of said fractionation zone at a temperature higher than the upper end thereof; withdrawing from the lower end of said fractionation zone a liquid containing most of the ethylene content of said feed and recovering an ethylene product therefrom.

9. A method as described in claim 8 in which reboiling heat is supplied to the lower end of said fractionating zone at a rate sufficient to maintain stripping vapor passing upwardly through said zone at a rate less than that required for stripping the upper region of said zone above the point of introduction of said warm first portion of liquid; and supplementing said stripping gases in said upper region of said zone by vapor from said warm first portion of liquid.

10. A method as described in claim 8 in which said ethylene-containing liquid from the lower end of said fractionation zone is fractionally distilled to separate an ethylene product therefrom; and the liquid remaining after the separation of said ethylene product is cooled by indirect heat exchange with outflowing tail gas, expanded, mixed with outflowing tail gas, and the vapor-liquid mixture so formed is passed in counter-current heat exchange with inflowing feed to refrigerate the latter.

References Cited in the file of this patent

UNITED STATES PATENTS

| 2,258,015 | Keith et al. | Oct. 7, 1941 |
| 2,483,869 | Arnold | Oct. 4, 1949 |
| 2,486,543 | Wenzke | Nov. 1, 1949 |
| 2,487,147 | Latchum | Nov. 8, 1949 |
| 2,500,129 | Laverty et al. | Mar. 7, 1950 |
| 2,503,265 | Haynes | Apr. 11, 1950 |
| 2,534,903 | Etienne | Dec. 19, 1950 |
| 2,617,272 | Aicher | Nov. 11, 1952 |